UNITED STATES PATENT OFFICE.

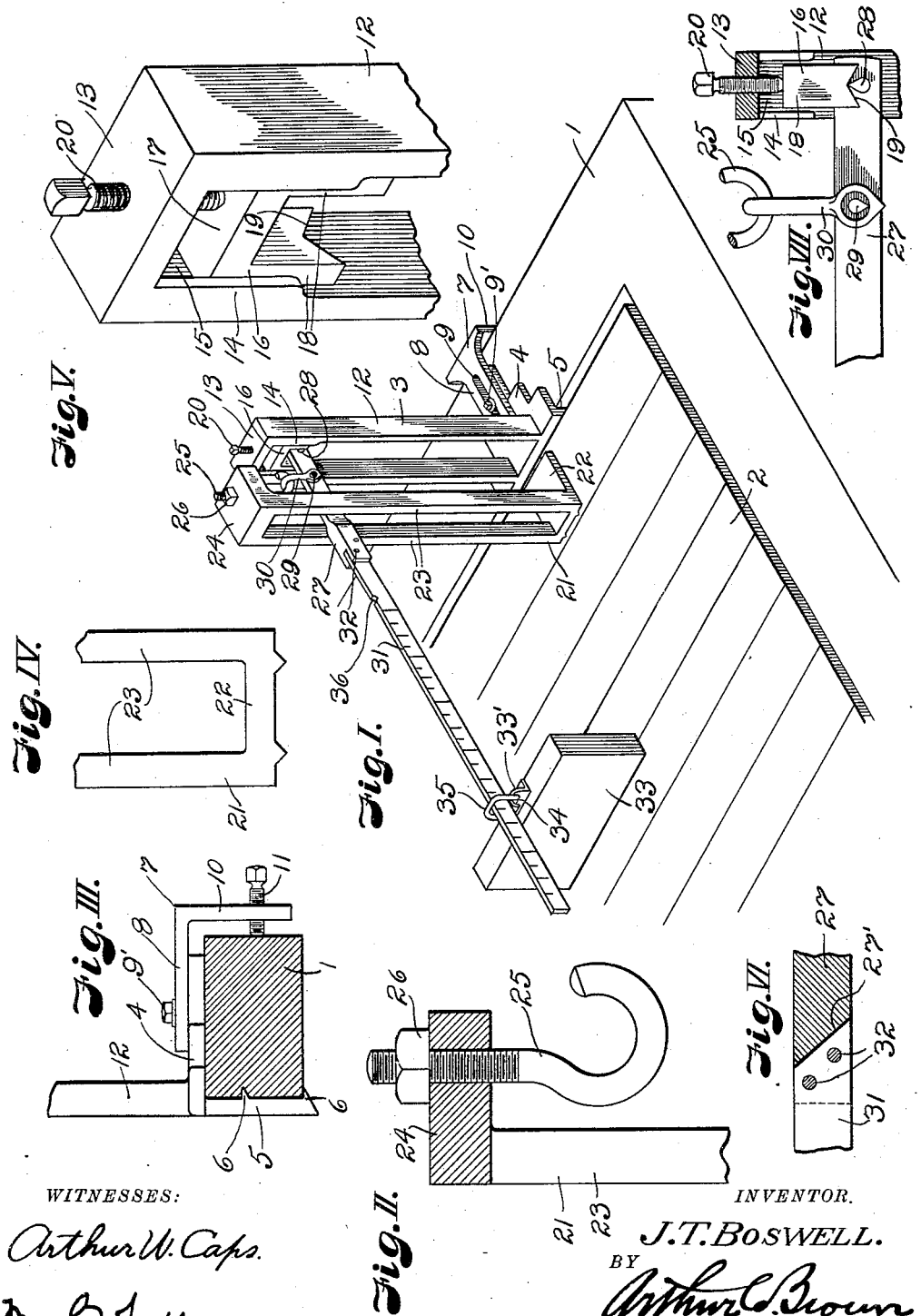

JOHN T. BOSWELL, OF KANSAS CITY, MISSOURI, ASSIGNOR TO LAURA BOSWELL AND GRACE BOSWELL, OF KANSAS CITY, MISSOURI.

SCALE-TESTER.

1,054,168.  Specification of Letters Patent.  Patented Feb. 25, 1913.

Application filed March 20, 1911. Serial No. 615,526.

*To all whom it may concern:*

Be it known that I, JOHN T. BOSWELL, a citizen of the United States, residing at Kansas City, in the county of Jackson and State of Missouri, have invented certain new and useful Improvements in Scale-Testers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to scale testers and has for its object to provide a device for ascertaining the accuracy of platform or other scales by producing a heavy pressure upon the scale platform, without the use of many expensive and cumbersome test weights. In accomplishing this object I provide a balance beam having a fulcrum bearing on a standard support on the scale frame, and a fulcrum bearing on a standard support on the scale platform, the beam being provided with a weight which may be used in the same manner as an ordinary scale weight.

I also provide other improved details of structure which will presently be described and claimed and are illustrated in the accompanying drawings, in which:—

Figure I is a perspective view of a scale tester constructed according to my invention. Fig. II is an enlarged detail view of a part of the platform standard and beam hanger. Fig. III is a cross section through the end of the scale frame, showing the frame standard applied thereto. Fig. IV is an end view of a part of the platform standard, showing the anchoring teeth. Fig. V is an enlarged perspective view of the upper end of the frame standard, showing the adjustable fulcrum bearing. Fig. VI is a detail view of the connection between the scale beam and its shank, parts being broken away for better illustration. Fig. VII is a detail view of the fulcrum connection between the beam shank and the frame and platform standard members.

Referring more in detail to the parts:—1 designates the frame and 2 the platform of a wagon scale of ordinary construction. Mounted on the frame 1 is a standard 3 having a base 4 provided with a depending flange 5 that is adapted to bear against the inner edge of the frame and is provided with inturned blades 6 which are adapted to be pressed into the frame when the latter is constructed of wood, or to receive a metal frame member therebetween.

7 designates the adjusting base member, which is provided with a neck 8, adapted to overlap a part of the base 4 and has a slot 9 through which a bolt 9′ that is carried by base 4 is adapted to project, so that the parts may be fixed securely together in an adjusted position. At the outer end of member 7 is a depending flange 10, which is adapted to hang over the scale frame and has set screws 11 which are adapted to project therethrough and engage the outer face of the frame, so that when they are tightened the base 4 will be pulled back to press the blades 6 into the wood, or tighten the entire base on a metal frame.

Rising from base 4 are the spaced standard members 12 having an upper connecting part 13 integral therewith. On the inner faces of the members 12, at the top of the standard, are inturned flanges 14 forming the ways 15 for a sliding fulcrum block 16, comprising a flat top member 17 and legs 18, the latter being provided with upturned notches 19 in their lower free ends. Extending through the top 13 of the frame standard is a set screw 20, which is adapted to bear against the top of the fulcrum block and provide adjustment therefor, for a purpose presently set forth.

Seated on the platform 2 is a standard 21 comprising the base 22, spaced vertical members 23, and a top shelf 24. Extending through the shelf 24 and depending in front of the opening between the spaced members 23, is a hook bolt 25, having a nut 26 bearing against the top of the shelf.

27 designates the shank of a scale beam which is provided, at one end, with trunnion members 28, which are preferably provided with knife edge contact portions at the top which are adapted to seat in the notches 19 in the adjustable fulcrum block on the frame standard. At an intermediate point on the shank are other trunnions 29 having downturned points for providing knife edge contacts with the eye members of a clevis 30, which is adapted to hang on the hook bolt 25 that is carried by the platform standard. The outer end of the shank 27 is slotted and provided with a rearwardly inclined face 27'.

31 designates the tester beam, which is preferably graduated as an ordinary scale beam and has a beveled inner end adapted for projection into the slot in the beam shank and engagement with the inclined face thereof, the parts being connected by any suitable means, such as bolts or rivets 32.

33 designates a weight which is preferably flat, as shown, so that it may be moved close to the platform standard and is provided with a bail-hook 33' having an opening 34, through which the bail 35 may be passed. The bail 35 is adapted for movement over the tester beam, and adapted to seat over the graduation points thereon, or to rest within a notch 36 near the fulcrum end of the beam.

In testing the device to determine the location of the graduations on the test beam, the standard 3 is located on the scale frame, near one corner, and the standard 21 seated on the scale platform adjacent the frame standard; the beam is fulcrumed as illustrated in Fig. I and the weight 33 placed in position with the bail in the notch 36. The scale beam is then balanced and a U. S. standard fifty pound test weight is placed on the platform and the scale weight moved out on its beam until said beam balances. The test weight is then removed and the weight 33 moved out on the beam 31 until the scale beam balances, when a graduation is marked on the beam. Additional fifty pound test weights are then used in the same manner to secure graduations up to one-thousand pounds or over, if desired.

With the tester correctly constructed and graduated, a scale may be tested by setting up the device in the same manner, balancing the scale with the tester in place and moving the test weight 33 out on its beam to a graduated point, for instance to the one-thousand pounds graduation. If the scale beam balances at one-thousand pounds, when test weight is moved out to the one-thousand pounds graduation point on the beam of the tester, the scale is evidently accurate, which may be proved by the fact that twenty, fifty pound test weights and the weight 33 placed at the one-thousand pound graduation point on the tester beam, produce exactly the same balance on the scale beam.

I have found from experience that the best results are secured with the tester when the beam is substantially horizontal, and in order to maintain the beam in that position, I provide either or both of the standards with means for adjusting the beam.

It is apparent that with the beam hung from the hook bolt and bearing upwardly on the fulcrum block of the frame standard, that by turning the screw 20, the sliding block may be raised or lowered to raise or lower the opposite end of the beam and that by allowing the block to remain stationary and turning the nut on the hook bolt, the beam may also be raised or lowered to secure the proper adjustment.

I prefer to make the tests near the corners of the scales and move the parts from one corner to another, so that a test is made near each corner of the scale, as the scale bearings are usually placed near the corner of the platform and testing each bearing with a one-thousand pound pressure, equals a weight of four-thousand pounds distributed over the scale platform.

While I have shown and described my device as applied to a wagon scale, I do not wish to be understood as limiting it thereto, as scales of other construction may be tested thereby.

Having thus described my invention, what I claim as new therein and desire to secure by Letters-Patent is:—

1. A scale tester comprising frame and platform standards, fulcrum member slidably mounted in the frame standard, a beam supported from the platform standard and engaging the slidably mounted fulcrum and means on the platform standard for adjusting said beam vertically.

2. A scale tester comprising frame and platform standards, a slidable block carried by the frame standard, a set screw extending through the top of the standard and engaging said block, means on the platform standard for supporting a beam, and a beam carried by said means and having fulcrum members engaging the sliding block, for the purpose set forth.

3. A scale tester comprising frame and platform standards, said frame standard having inturned flanges at the top for forming ways, a block slidably mounted in said standard and having downturned legs provided with notches in their under faces, a set screw threaded into the top of said standard and adapted for adjustably engaging the top of the block, means on the platform standard for supporting a beam, and a beam carried by said means and having fulcrum members seated in the notches in said block, for the purpose set forth.

4. A scale tester comprising frame and platform standards, a beam supported by said platform standard engaging the frame standard, and means on said standards for independently adjusting the said beam.

5. A scale tester comprising frame and platform standards, a two-piece beam supported by the platform standard and engaging the frame standard, and means on each of said standards for independently adjusting the beam.

6. A scale tester comprising frame and platform standards, a scale beam having shank and graduated portions supported by the platform standard and engaging the frame standard, and means on one of the standards for adjusting the beam.

7. A scale tester comprising frame and platform standards, and a scale beam fulcrumed thereon, said frame standard having an adjustable base, and a depending flange on the frame standard having blades for clamping said base on a scale frame.

8. A scale tester comprising frame and platform standards, and a beam fulcrumed thereon, said frame standard having a depending flange provided with blades, and a member having a neck adjustably connected with the body of the standard base and a depending flange provided with a set screw, substantially as and for the purpose set forth.

9. A scale tester comprising frame and platform standards, said platform standard being provided with an apertured shelf, a hook bolt having a threaded shank projected through the aperture in said shelf, a nut on the upper end of said shank, bearing on the top of the shelf and supporting the bolt therefrom, a clevis hung on said hook bolt, a beam fulcrumed in said clevis and in the frame standard and adapted to be horizontally adjusted by the hook bolt of the platform standard.

10. A scale tester comprising frame and platform standards, and a scale beam fulcrumed thereon, said frame standard having a depending bladed flange for the purpose set forth.

11. A scale tester comprising frame and platform standards, and a scale beam fulcrumed thereon, said frame standard having depending flanges, one of said flanges having a plurality of blades and a set screw disposed in the other of said flanges, for clamping the frame standard on a scale frame.

12. A scale tester comprising frame and platform standards, a scale beam, having a slotted shank, adapted for receiving a tester beam, the said beams being adjustably supported on said platform standard and having fulcrum bearing on the same standards.

13. A scale tester comprising frame and platform standards, a scale beam having shank and graduated portions and adjustably supported on said platform standard, and having adjustable engagement with the frame standard.

14. A scale tester comprising frame and platform standards having base, vertical and top portions, said platform standard having a depending adjustable member in its top portion, adapted for supporting a beam, and a beam carried by said member, said frame standard having a block slidably mounted on its vertical portions and provided with downturned legs, and a set screw threaded into the top of said standard and adapted for moving the block legs into engagement with the said beam.

In testimony whereof I affix my signature in presence of two witnesses.

JOHN T. BOSWELL.

Witnesses:
MYRTLE M. JACKSON,
ARTHUR W. COPS.

Copies of this patent may be obtained for five cents each, by addressing the "Commissioner of Patents, Washington, D. C."